United States Patent
Weinstein et al.

(10) Patent No.: US 10,593,911 B2
(45) Date of Patent: Mar. 17, 2020

(54) FLEXIBLE MICRO-BATTERY

(71) Applicant: Johnson & Johnson Vision Care, Inc., Jacksonville, FL (US)

(72) Inventors: Lawrence Edward Weinstein, Silver Spring, MD (US); Leonard Pagliaro, Bowie, MD (US); Jonathan Howarth, Baltimore, MD (US); Jean-Francois Audebert, Falls Church, VA (US); Taylor Xu, Rockville, MD (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 339 days.

(21) Appl. No.: 15/326,161

(22) PCT Filed: Jul. 21, 2015

(86) PCT No.: PCT/US2015/041365
§ 371 (c)(1),
(2) Date: Jan. 13, 2017

(87) PCT Pub. No.: WO2016/014554
PCT Pub. Date: Jan. 28, 2016

(65) Prior Publication Data
US 2017/0200923 A1    Jul. 13, 2017

Related U.S. Application Data

(60) Provisional application No. 62/026,851, filed on Jul. 21, 2014.

(51) Int. Cl.
*H01M 2/02* (2006.01)
*H01M 4/24* (2006.01)
(Continued)

(52) U.S. Cl.
CPC ....... *H01M 2/0275* (2013.01); *H01M 2/0292* (2013.01); *H01M 2/1094* (2013.01); *H01M 4/244* (2013.01); *H01M 4/38* (2013.01); *H01M 4/483* (2013.01); *H01M 4/50* (2013.01); *H01M 4/623* (2013.01); *H01M 4/625* (2013.01);
(Continued)

(58) Field of Classification Search
None
See application file for complete search history.

(56) References Cited

U.S. PATENT DOCUMENTS

| 3,690,325 A | 9/1972 | Kenny |
| 2004/0029005 A1 | 2/2004 | Leising et al. |

(Continued)

FOREIGN PATENT DOCUMENTS

| CA | 2843727 A1 | 2/2013 |
| CN | 102881944 A | 1/2013 |

(Continued)

OTHER PUBLICATIONS

European Search report for corresponding EPA No. 15824158.8 dated Dec. 17, 2015.

*Primary Examiner* — Jonathan Crepeau
*Assistant Examiner* — Angela J Martin

(57) ABSTRACT

A flexible micro-battery construction which can be contorted in three dimensions while maintaining operation and providing biocompatibility and useful power necessary for small medical and other devices is provided.

11 Claims, 15 Drawing Sheets

(51) Int. Cl.

| | | |
|---|---|---|
| *H01M 4/38* | (2006.01) | |
| *H01M 4/48* | (2010.01) | |
| *H01M 4/50* | (2010.01) | |
| *H01M 4/62* | (2006.01) | |
| *H01M 10/04* | (2006.01) | |
| *H01M 4/66* | (2006.01) | |
| *H01M 10/28* | (2006.01) | |
| *H01M 10/26* | (2006.01) | |
| *H01M 2/10* | (2006.01) | |
| *H01M 4/02* | (2006.01) | |

(52) U.S. Cl.
CPC ....... *H01M 4/661* (2013.01); *H01M 10/0436* (2013.01); *H01M 10/26* (2013.01); *H01M 10/287* (2013.01); *H01M 2004/021* (2013.01); *H01M 2300/0002* (2013.01); *H01M 2300/0014* (2013.01); *H01M 2300/0085* (2013.01)

(56) References Cited

U.S. PATENT DOCUMENTS

| | | |
|---|---|---|
| 2006/0159990 A1 | 7/2006 | Ryu et al. |
| 2007/0212597 A1 | 9/2007 | Herlinger |
| 2008/0254348 A1 | 10/2008 | Hatta et al. |
| 2011/0311857 A1 | 12/2011 | Tucholski |
| 2012/0107666 A1 | 5/2012 | Bailey |
| 2013/0019552 A1 | 1/2013 | Murdock et al. |
| 2013/0029205 A1 | 1/2013 | Adams |
| 2013/0130087 A1 | 5/2013 | Kawaguchi et al. |
| 2013/0195523 A1 | 8/2013 | Yamaji et al. |
| 2013/0260214 A1 | 10/2013 | Ueda |
| 2016/0020481 A1 | 1/2016 | He et al. |
| 2016/0054593 A1 | 2/2016 | Flitsch et al. |
| 2016/0056417 A1 | 2/2016 | Flitsch et al. |
| 2016/0248053 A1 | 8/2016 | Iseri et al. |

FOREIGN PATENT DOCUMENTS

| | | | |
|---|---|---|---|
| CN | 203636362 U | 6/2014 | |
| CN | 103915645 A | 7/2014 | |
| CN | 103915646 A | 7/2014 | |
| CN | 105406086 A | 3/2016 | |
| EP | 1156541 A2 | 11/2001 | |
| EP | 1156541 A3 | 3/2003 | |
| EP | 1156541 B1 | 1/2013 | |
| EP | 2996172 * | 3/2016 | ............. H01M 2/02 |
| EP | 2996683 A2 | 4/2018 | |
| JP | 2011-214074 A | 10/2011 | |
| KR | 2016031639 A | 3/2016 | |
| RU | 2364988 C1 | 8/2009 | |
| WO | WO2006028347 A1 | 3/2006 | |
| WO | WO2006028347 B1 | 6/2006 | |
| WO | WO2010033683 A1 | 3/2010 | |
| WO | WO2011093806 A3 | 8/2011 | |
| WO | WO2013/019525 A1 | 7/2013 | |
| WO | WO2016/014554 A1 | 1/2016 | |

* cited by examiner

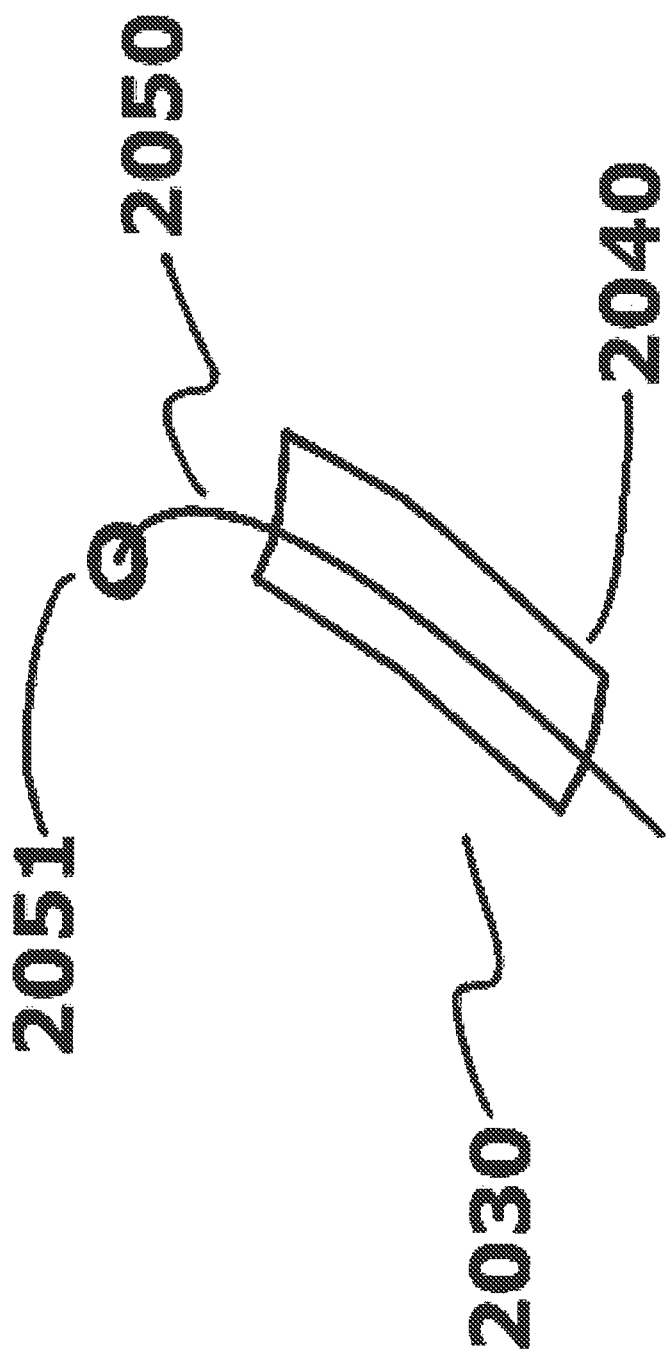

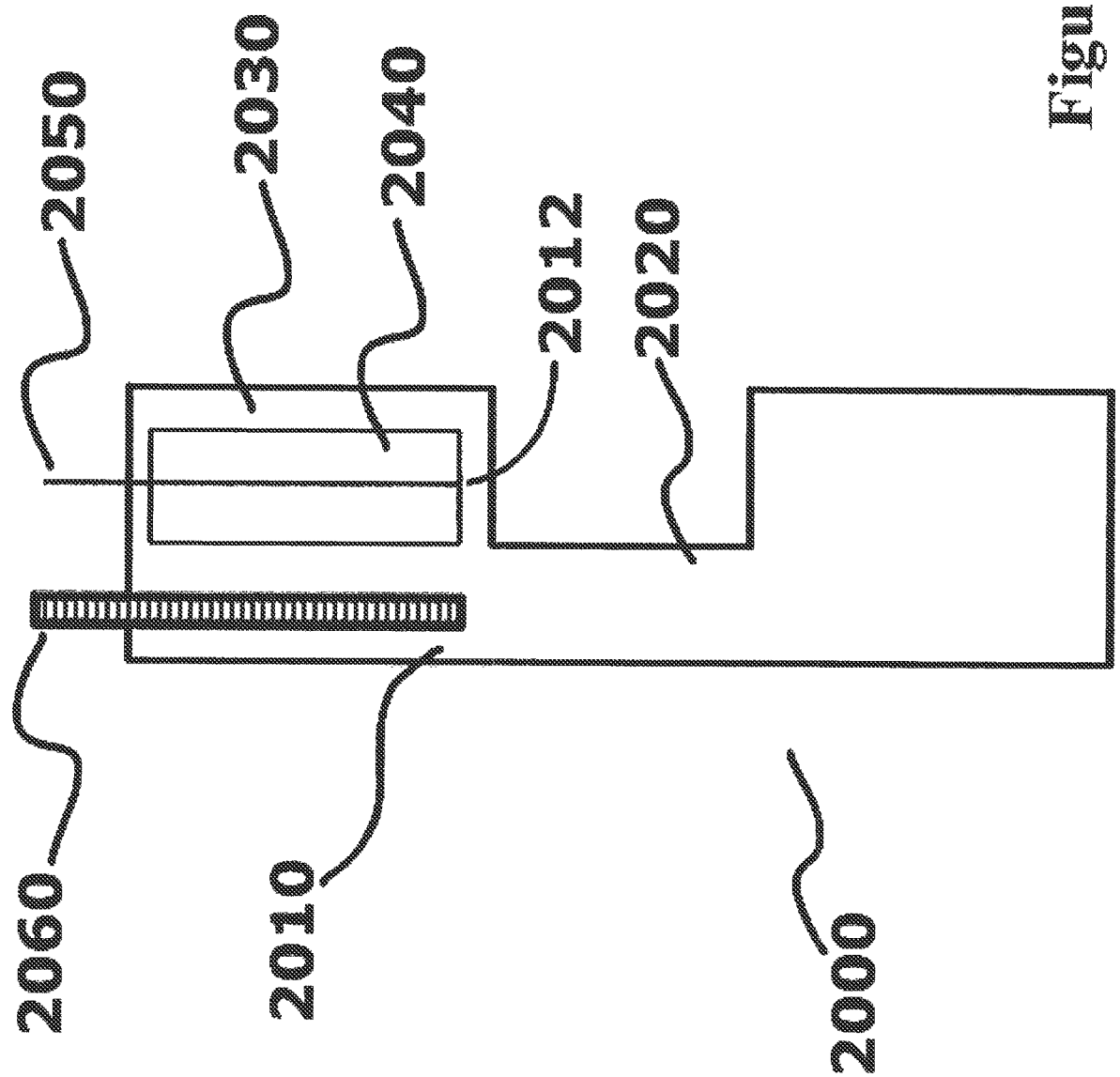

FLEXIBLE MICRO-BATTERY

CROSS-REFERENCE TO RELATED APPLICATION

This application is the national stage filing under 35 USC 371 of international application PCT/US2015/041365 filed on Jul. 21, 2015 which claims the benefit of U.S. Provisional Patent Application No. 62/026,851 filed on Jul. 21, 2014.

FIELD OF THE INVENTION

The present invention generally relates to an electrochemical battery, and more particularly to a biocompatible micro-electrochemical cell configurable in a myriad of shapes.

BACKGROUND OF THE INVENTION

There are a number of micro-batteries that are designed to be implantable or otherwise associated with a medical or other device that require a power source for operation. Many of these micro-batteries are customized for the particular device in that their shape and power output match the particular device requirements. Thus, these custom designed micro-batteries cannot generally be utilized in devices they were not designed for as there are associated fit and power deficiencies. For purposes of this specification, a micro-battery is defined by its relatively small dimensions. Specifically, at least one dimension (that it the length, width or thickness of the battery) shall be less than one millimeter (1.0 mm), and a second dimension shall be less than one centimeter (1.0 cm).

Micro-batteries used in ocular medical devices can have unique and challenging requirements such as the need for flexibility, biocompatibility, and the associated in vivo environment. A contact lens using a micro-battery requires the battery to possess the qualities of the lens by having a long shelf life, have a measure of flexibility and being able to operate after being manipulated, and be biocompatible for the time period starting with lens manufacturing through the usage lifetime of the lens. This time period exposes the micro-battery to the saline within the lens, and the micro-battery must not only maintain its capacity and ability to provide the required power to the lens, but also be adequately sealed so as to prevent leaching of the battery components. The dimensions of a micro-battery makes isolation of the battery components particularly challenging as the surface area to volume ratio of the micro-battery can be very high.

Many micro-batteries, especially those mass-produced or those needing biocompatibility are encased in rigid exteriors. This rigidity makes it difficult for these micro-batteries to fit in any device which they are not designed for. In addition, their rigidity typically does not allow such batteries to be utilized in flexible devices.

Micro-batteries with flexible packaging or non-rigid exteriors have very little flexibility, and most often the internal construction of the micro-battery does not allow the battery to be bent or twisted. Batteries utilizing conductive traces require both flexible traces and flexible substrates on which to support the trace. Such flexibility is not found in materials compatible with an oxidizing battery environment. Instead, the batteries of the prior art are typically constructed to be generally immobile after being manufactured. Movement of the battery can adversely affect connections, sealing of the exterior and otherwise affect the proper operation of the battery.

There exists a need for a micro power supply that is biocompatible, can be used in medical and other small devices, and that is capable of repeated or continuous operation by providing required energy while the device is being, bent, flexed or otherwise manipulated and after such manipulation.

SUMMARY OF THE INVENTION

According to one aspect of the present invention, an electrochemical micro-battery with biocompatible components is provided that comprises a cylindrical anode extending along a first vector and a generally planar cathode extending along a second vector. The second vector is generally parallel to said first vector, and the cathode is disposed from the anode by a predetermined space. A cathode collector is in electrical contact with the cathode and extends along the second vector. The electrochemical micro-battery also includes an electrolyte positioned generally surrounding both the anode and the cathode and positioned within the predetermined space to provide ionic conductivity between the anode and cathode. Packaging generally surrounds the anode, cathode, cathode collector and the electrolyte. Terminal ends of the anode extend through the packaging along the first vector, and the cathode collector also extends through the packaging along the second vector. The packaging has a generally uniform thickness.

The electrochemical micro-battery can be shaped in all three dimensions and embodiments include a planar shape as well as a shape wherein both the first vector and the second vector are arcuate, and wherein the first vector and second vector are concentric to each other.

The electrochemical micro-battery according to further aspects of the present invention includes an anode made of zinc. The cathode of the present invention comprises manganese dioxide, a conductive additive material, and a binder. The cathode collector can comprise a wire shaped metal such as titanium and can be positioned adjacent or alternatively within the cathode. In the embodiment where the cathode collector is positioned within the cathode the diameter of the anode equals the thickness of the cathode, so that the thickness of the electrochemical cell equals the anode diameter in addition to the packaging thickness.

The first electrochemical cell of the micro-battery can operate as a single cell or be connected to a second electrochemical cell in series or parallel to the first electrochemical cell. In the series embodiment the anode of the first electrochemical cell is electrically connected to the cathode collector of the second electrochemical cell. The anode of the electrochemical cell can be welded to the cathode collector of the second electrochemical cell to form a mechanically secure and electrically communicating connection.

The micro-battery cells can be independently packaged or the packaging of the first electrochemical cell and the packaging of the second electrochemical cell are joined as to form a contiguous package. The packaging can be vacuum formed the process of which can shape the electrochemical battery cell into a desired shape in three dimensions.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 11B is a perspective view of an interim form of the cathode and cathode collector assembly of the present invention as described in the illustrative example;

FIG. 11D is perspective view of the present invention as prepared in the substrate as described in the illustrative example.

DETAILED DESCRIPTION OF THE PREFERRED EMBODIMENTS

Figure 1:
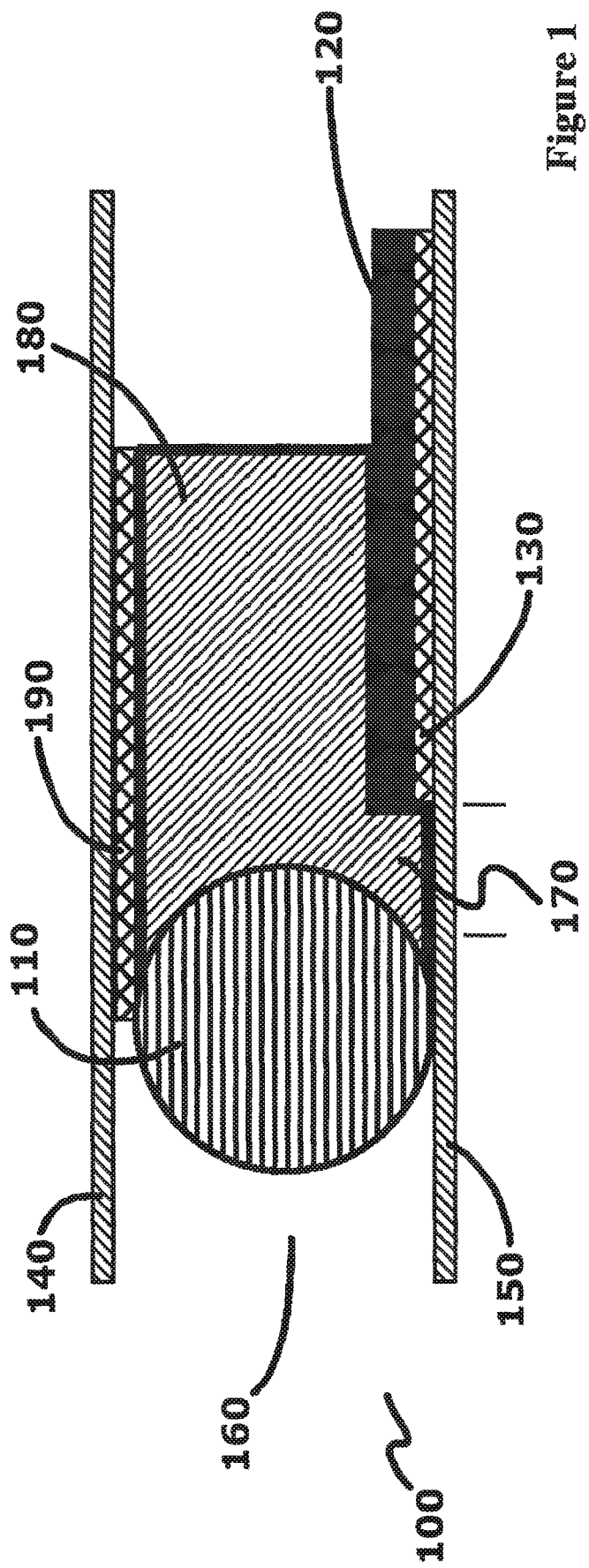
FIG. 1 is a cross sectional view of an electrochemical battery cell taken along a plane normal to the vector L (length)
Figure 2:
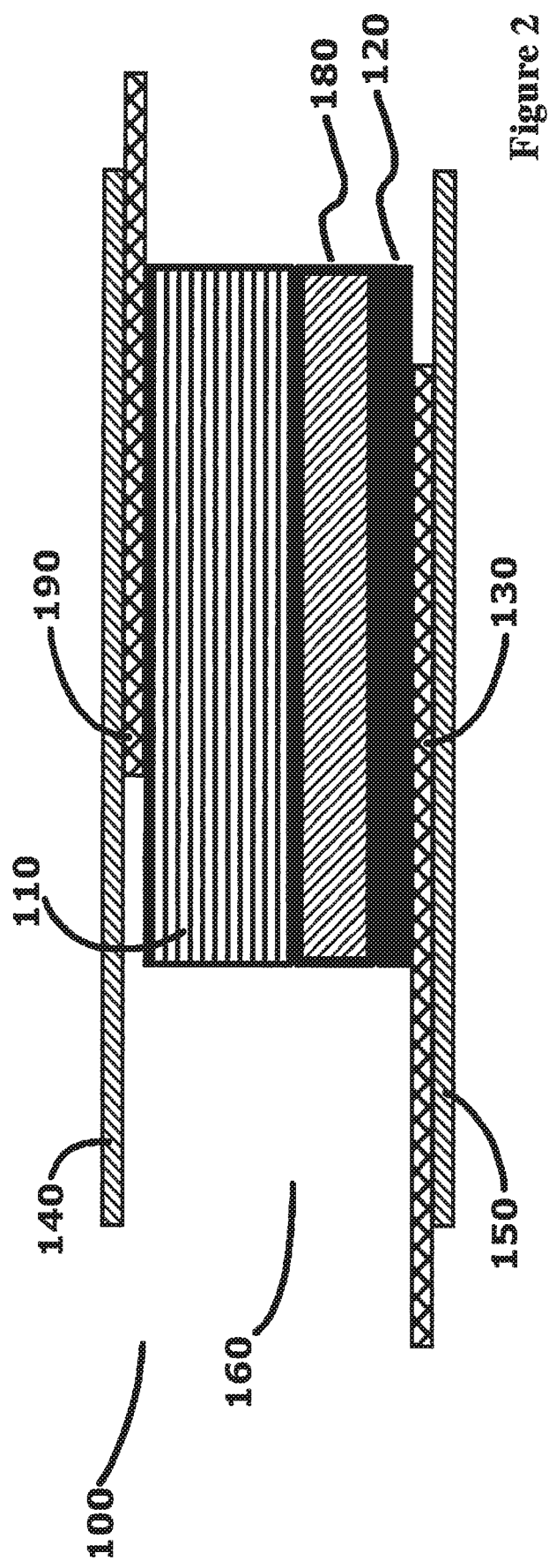
FIG. 2 is a cross sectional view of the electrochemical battery cell taken along a plane normal to the vector H (height)

Referring to FIG. 1 and FIG. 2, there is shown two different cross sectional representations of the electrochemical battery cell 100 according to one embodiment. FIG. 1 is a cross section representation along a plane normal to the vector L (length) and FIG. 2 is a cross section representation along a plane normal to the vector H (height).

The electrochemical battery cell includes a cylindrical anode 110 which extends along the length of the electrochemical battery cell and serves as the negative electrode. More specifically, the anode 110 extends along a vector parallel to the length vector L shown in FIG. 2. The anode 110 is generally cylindrical in shape and circular in cross-section. The diameter of the anode 110 is small enough and its aspect ratio (length to width ratio) is large enough to enable flexibility of the anode 110. The diameter is sized large enough to accommodate the absence of any current collector. As the electrochemical battery cell discharges, reactive material from the anode will electrochemically react and go into solution. As the anode reactive material leaves the anode, the surface of the anode may pit or otherwise change and a general decreasing in diameter may be realized. The remaining anode material remains contiguous so as to remain capable of acting as an anode current collector throughout its length and as such is capable of conducting electrons from the anode out of the electrochemical battery cell.

As will be described again below in more detail, the anode 110 is positioned on one side of the electrochemical battery cell in this embodiment adjacent the exterior first and second packaging portions 140 and 150. The first packaging portion 140 and the second packaging portion 150 are disposed relative each other to form a cell interior 160. The packaging portions are manufactured from a material that can be bonded or otherwise sealed to itself. The packaging portion material should also be flexible and capable of enclosing all components located within the cell interior 160.

The electrochemical battery cell further includes a cathode 120 which also extends along the length of the electrochemical battery cell and serves as the positive electrode. More specifically, the cathode 120 extends along a vector parallel to the length vector L shown in FIG. 2. In this embodiment the cathode 120 is generally planar and rectangular in cross section. The cathode is positioned in electrical contact with a cathode current collector 130, and in this embodiment is coated onto the cathode current collector 130. This arrangement of coating the cathode 120 onto a flexible conducting current collector 130 provides a flexible cathode construction that remains coherent while the electrochemical battery cell 100 is twisted, bent or otherwise contorted. As the electrochemical battery cell electrochemically discharges, reactive material from the cathode 120 will electrochemically react and possibly expand. The cathode is designed to accommodate such expansion by being made with an appropriate porosity and by being made from appropriate ingredients that accommodate any such expansion. Such accommodation enables the cathode 120 to maintain adhesion with the cathode current collector 130 and otherwise remain coherent.

The cathode 120 and the cathode current collector 130 are shown positioned and supported on the second packaging portion 150 and at a position opposed to the anode 110 within the cell interior 160. Although the sizes of the anode 110 and the cathode 120 shown in FIG. 1 and FIG. 2 are not necessarily to scale, the relative positions of the anode and cathode are gapped by a predetermined space 170. The dimensions of the predetermined space within the cell interior are important so as to ensure the anode and cathode do not make direct contact with each other which would cause a battery short circuit. The dimension should also not be so large as to prevent effective ionic charge diffusion which directly relates to the rate capability of the electrochemical battery cell. Although in alternative embodiments, a permeable membrane battery separator can be used, the cell construction of the present embodiment obviates the need for added manufacturing complexity and expense of adding such a component.

The cathode 120 and the anode 110 ionically communicate via an electrolyte 180 which is positioned such that both the anode and cathode can ionically communicate with the electrolyte material. Put another way, the electrolyte 180 allows the flow of electric charge between the anode 110 and the cathode 120. The electrolyte 180 can be a liquid, gel or semi-solid as long as it is flexible and capable of moving within the cell interior 160 while performing its task of providing ionic diffusion between the anode 110 and cathode 120.

The electrons generated by the electrochemical battery cell 100 can be conducted from the cell via an anode collector tab 190. This anode collector tab 190 can be affixed to an end of the anode 110 so as to be in electric communication with the anode 110. The anode collector tab 190 provides a shape appropriate extension of the anode 110 so that the cell interior 160 can be appropriately sealed, with both the anode 110 and cathode 120 electrically communicating exterior of the cell interior 160 and both first and second packaging portions 140 and 150. The position of the anode collector tab 190 in FIG. 1 and FIG. 2 is shown intermediate the anode 110 and the first packaging portion 140. As can be seen, this positioning may add height or a protrusion to the electrochemical battery cell 100 and an alternative position may be preferred to as to avoid increasing these dimensions. The anode collector tab 190 is shaped relative to what it will be connecting to in a device. This shape can be selected by one skilled in the art so as to create an electrically secure connection between the anode tab and the device.

Although not shown in the embodiment of FIG. 1 and FIG. 2 both the anode collector tab 190 and the cathode current collector 130 can extend beyond the respective ends of the anode 110 and the cathode 120. These extending portions of the anode collector tab 190 and the cathode current collector 130 enable more efficient sealing of the cell interior 160. The first and second packaging portions 140 and 150 can be both sealed to each other so as to seal the cell interior 160 from the exterior or the electrochemical battery cell 100, and sealed around the anode collector tab 190 and the cathode current collector 130 which extend exterior the sealed first and second packaging portions 140 and 150. As such, the anode collector tab 190 becomes the negative exterior contact for the electrochemical battery cell 100, and the cathode current collector 130 becomes the positive exterior contact for the electrochemical battery cell.

In operation, when a load (not shown) is electrically connected to both the anode collector tab 190 and the cathode current collector 130 to form a circuit, the anode 110 releases electrons via the anode collector tab 190 to the negative exterior contact while simultaneously releasing ions into the electrolyte 180. The cathode 120 accepts the electrons flowing from the circuit through the positive exterior contact and the cathode current collector 130 and electrochemically reacts so as to equilibrate the chemical potential of the electrochemical battery cell. The present arrangement of the electrochemical battery cell 100 effectively operates thus while in torsion, while being bent, or otherwise manipulated.

Figure 3:
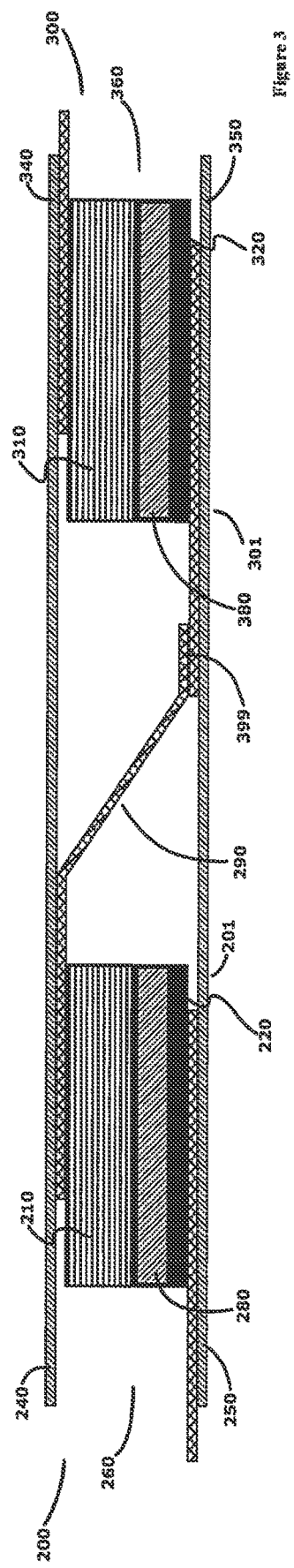
FIG. 3 is a cross sectional representational view of the electrochemical battery cell of the present invention.

The electrochemical battery cell 100 shown in FIG. 1 and FIG. 2 can be electrically and mechanically coupled in series with an identical cell as shown in FIG. 3. In FIG. 3, there is shown a first electrochemical battery cell 200 and its respective negative end portion 201. The first electrochemical battery cell 200 possesses an anode 210, a cathode 220 and an anode collector tab 290. Also shown in FIG. 3 is a second electrochemical battery cell 300 and its positive end portion 301. The second electrochemical battery cell also has an anode 310, a cathode 320 and a cathode current collector 330. As shown in FIG. 3 the anode collector tab 290 of the first electrochemical battery cell 200 is connected to the cathode current collector 330 of the second electrochemical battery cell 300 at connection point 399. This mechanical and electrical coupling arrangement creates a multi-cell battery with two electrochemical battery cells in series so as to provide an effective voltage twice that of each individual cell. Alternative coupling arrangements can be used to create parallel and other multi-cell batteries using two or more cells.

Figure 4:
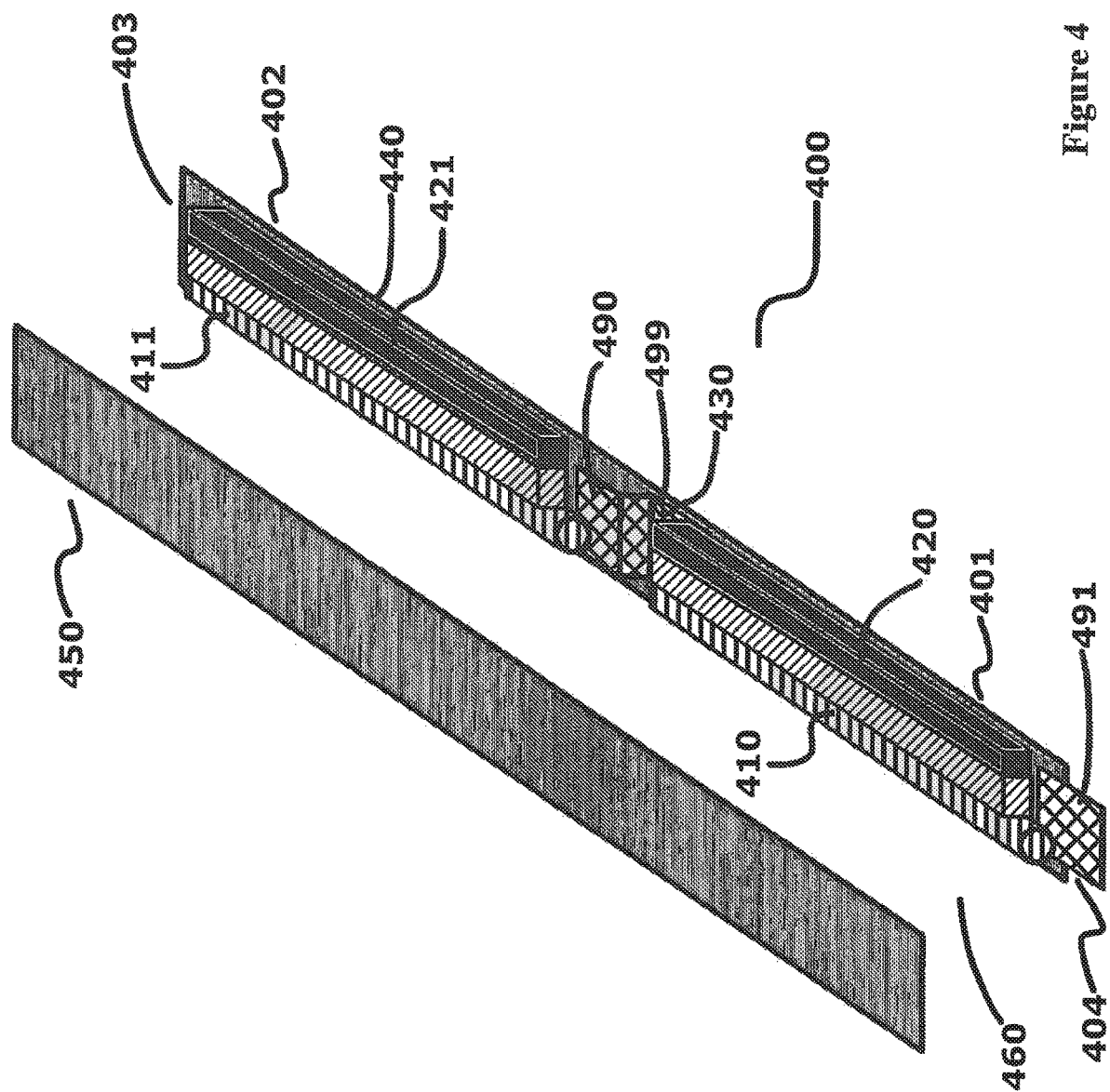
FIG. 4 is a perspective view of the electrochemical battery cell with the packaging portion exploded.

The respective packaging portions 240 and 340, and 250 and 350 are shown joined so as to form a contiguous exterior surface or manufactured as single packaging portions. However as will be described in more detail the respective cell interiors 260 and 360 are preferably segregated. In FIG. 4, there is shown an alternative view of the two batteries in series 400. A first electrochemical battery cell 401 is electrically and mechanically coupled to a second electrochemical battery cell 402. Both the first electrochemical battery cell 401 and the second electrochemical battery cell 402 have respective anodes 410 and 411, and respective cathodes 420 and 421. Each cathode is associated with and electrically coupled to a cathode current collector, and the first electrochemical battery cell cathode 420 is associated with first electrochemical battery cell cathode current collector 430, and the second electrochemical battery cell cathode 421 is likewise associated with a second electrochemical battery cell cathode current collector 431. The second electrochemical battery cell anode 411 is electrically and mechanically associated with a second electrochemical battery cell anode collector tab 490 which is also electrically and mechanically associated with the first electrochemical battery cell cathode current collector 430 at connection point 499.

The two electrochemical cell in series is surrounded on the cathode side by a first packaging portion 440 which extends the length of the two cells in series but is terminated at a first end 403 so as to enable the second electrochemical battery cell cathode current collector to overhang the first packaging portion. At a second end 404, the first packaging portion is similarly terminated so as to enable the first electrochemical battery cell anode collector tab 491 to extend beyond the second end. A second packaging portion 450 similar in length and width to the first packaging portion 440 is positioned adjacent the anode side of the two batteries in series and the cell interior 460 can be sealed by associating the first packaging portion 440 and second packaging portion adhesively or by welding in a manner that allows both the second electrochemical battery cell cathode current collector and the first electrochemical battery cell anode collector tab to extend beyond the packaging portions so as to enable them to be in electrical communication with an external load (not shown).

Figure 5A:
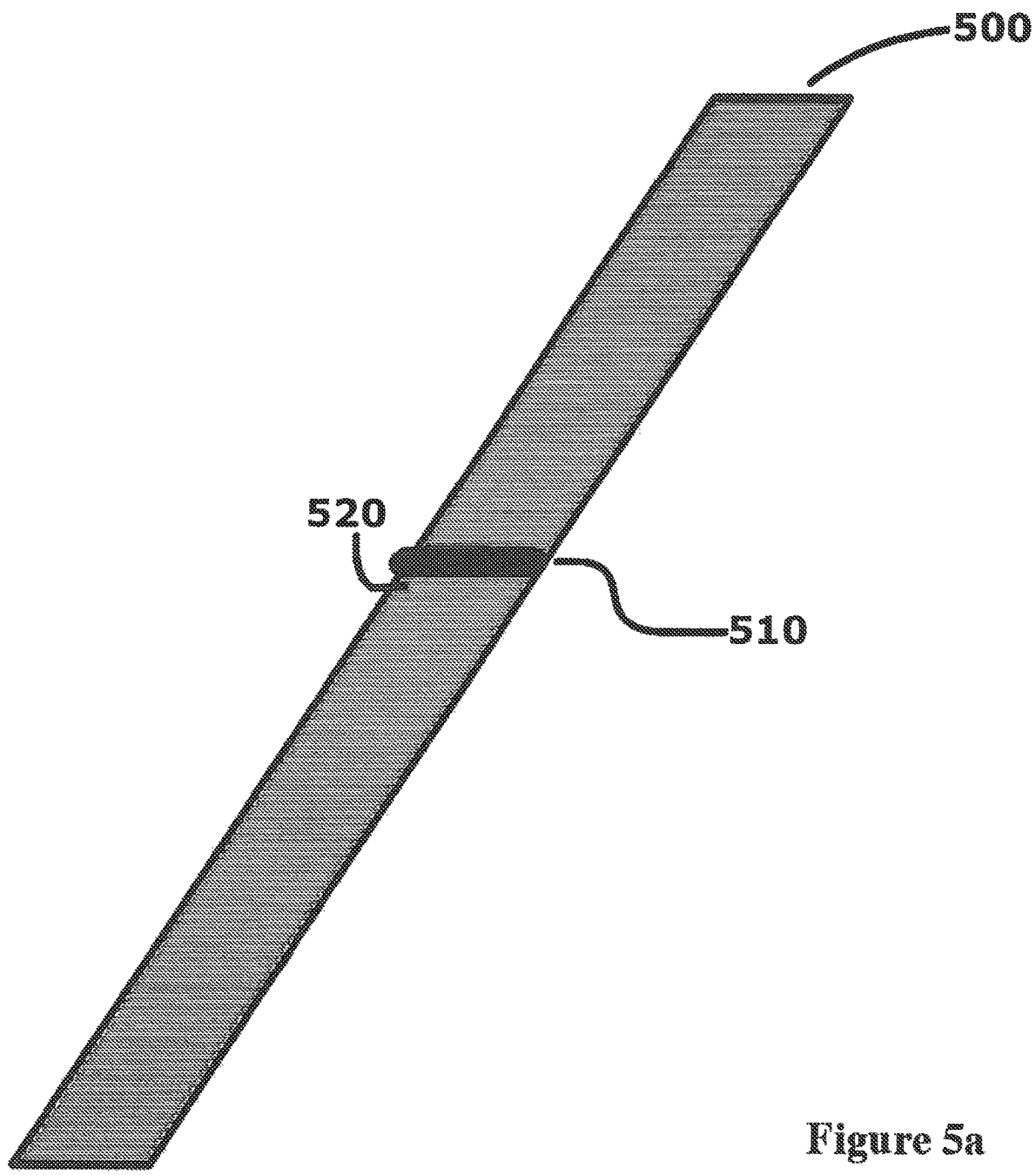
FIG. 5A is a perspective view of the packaging portion of the electrochemical battery cell according to one embodiment.

It may be preferred to segregate the cell interior 460 into individual cell interiors associated with each electrochemical battery cell. This can be done by providing a divider adjacent the connection point 499. Referring to FIG. 5A there is shown a packaging portion 500 that can be used to provide the cell interior segregation of this embodiment. The packaging portion 500 includes a divider 510 which can be affixed to the packaging portion at a segregation spot 520 on the packaging portion. The divider 510 can be configured to act as a dam between two electrochemical battery cells in series so as to prevent ionic conduction and convective flow between the cells. The divider 510 can be laser welded to the packaging portion and then again laser welded when the packaging portion 500 is sealed relative a second packaging portion via laser welding or an alternative connecting method. In an alternative embodiment, the divider can be affixed via alternative joining methods such as ultrasonic welding, or other heat welding methods.

Figure 5B:
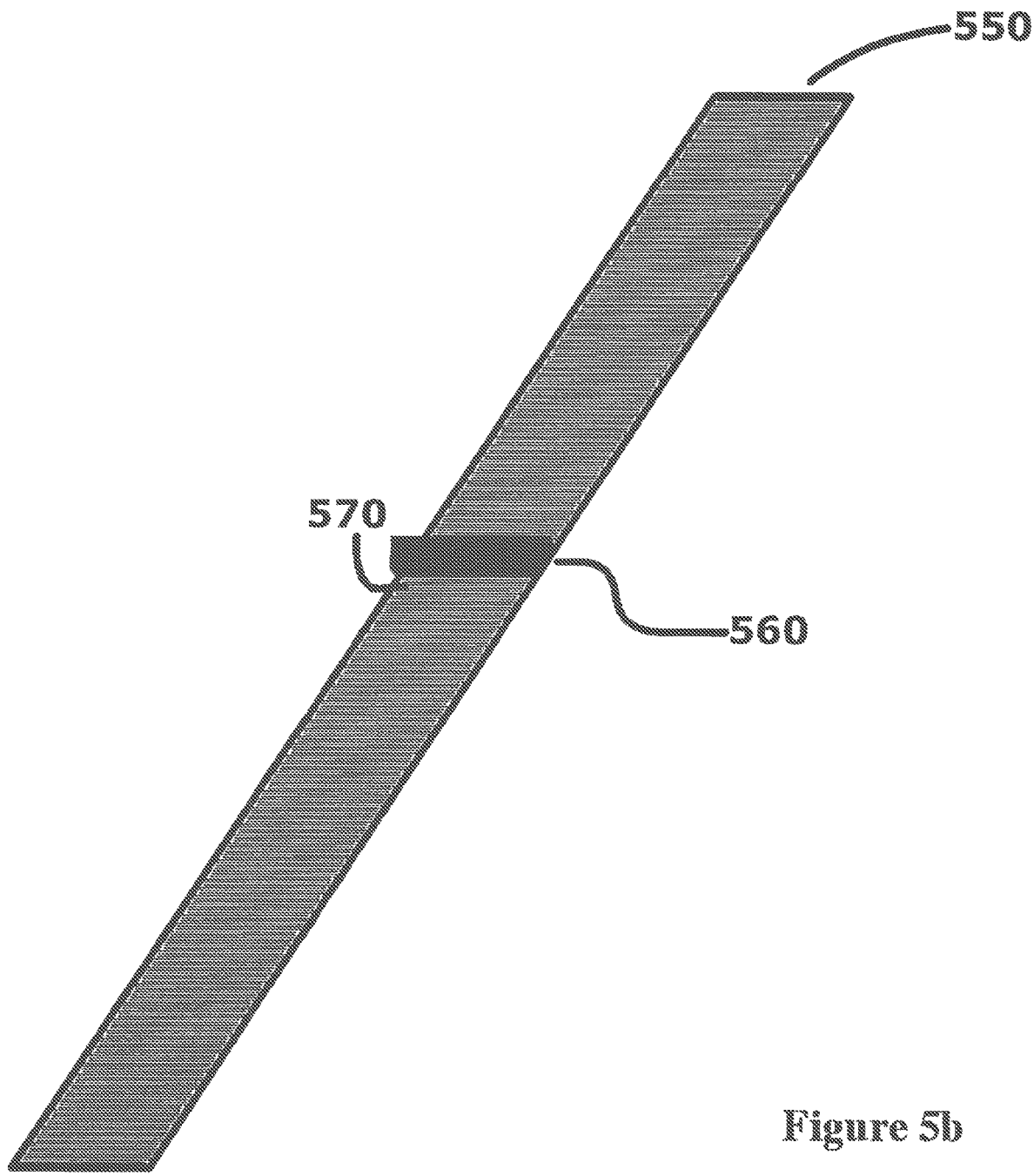
FIG. 5B is a perspective view of the packaging portion of the electrochemical battery cell according to another embodiment.

In FIG. 5B, there is shown an alternative embodiment of providing segregation of the cell interior. A packing portion 550 includes a divider 560 at a segregation spot 570 on the packaging portion. The divider 560 can be secured to the packaging portion and a second packaging portion via adhesive and more preferably via UV-cured adhesive. The first and second packaging portions can be sealed relative each other at their peripheries and the divider 560 adhesively secured to both packaging portions so as to provide the segregation of the cell interior.

Figure 6:
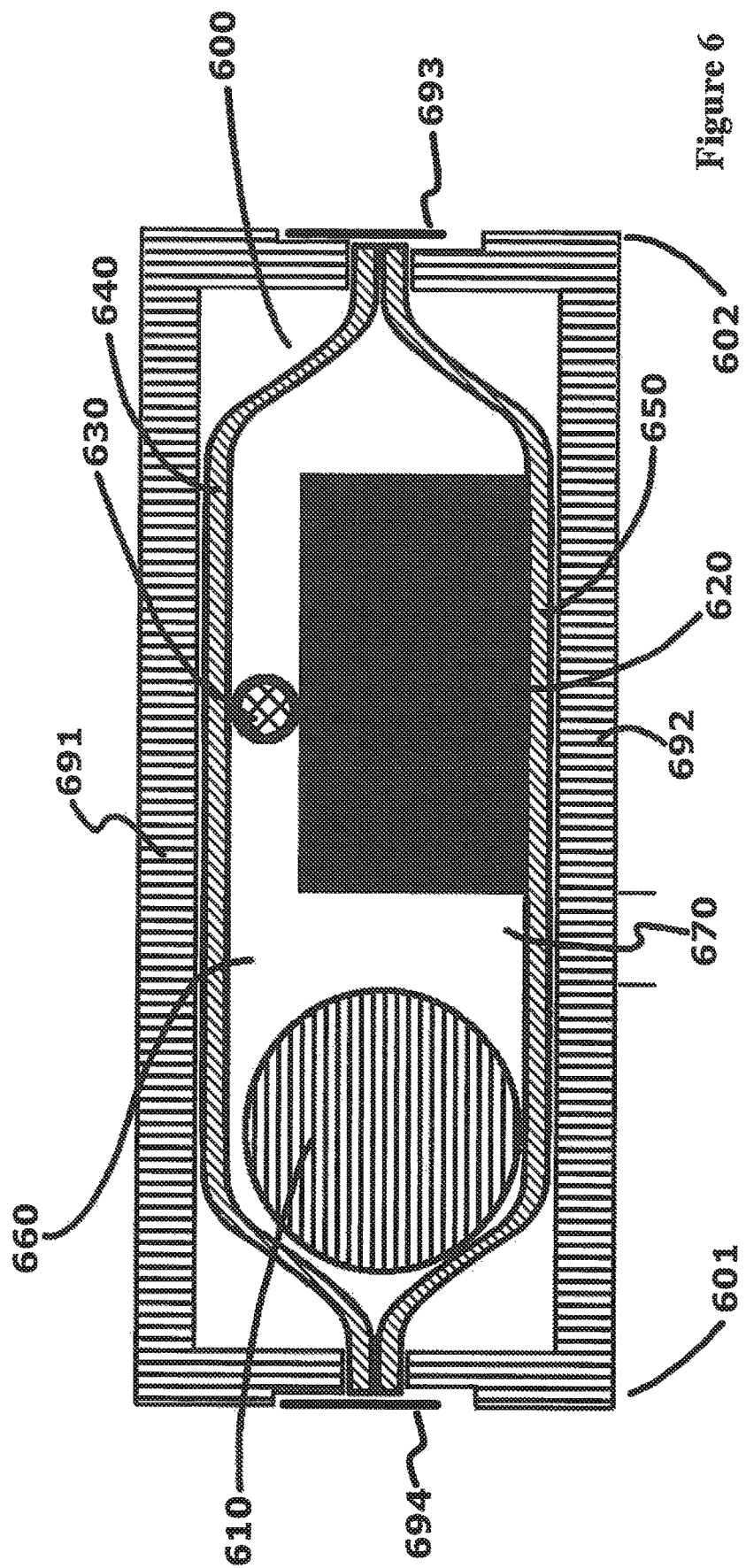
FIG. 6 is a cross sectional view of the electrochemical battery cell of the present invention disposed in an ultrasonic welding fixture depicting a method of sealing the exterior packaging.

In FIG. 6, there is shown a cross sectional view of an alternative embodiment of the electrochemical battery cell 600. In this embodiment the electrochemical battery cell 600 possesses a cylindrical shaped electrochemical battery cell cathode current collector 630, which is shown positioned between the electrochemical battery cell cathode 620 and a first packaging portion. Although not shown, the electrochemical battery cell cathode current collector can alternatively be disposed within or partially within the cathode 620. An anode 610 is located within the cell interior 660 at a predetermined distance 670 from the cathode 620. The cell interior is filled with electrolyte (not shown) to provide required ionic conductivity between the anode and cathode electrodes.

A method of joining both the first packaging portion 640 and the second packaging portion 650 along their respective peripheries can be described using FIG. 6. The electrochemical battery cell 600 can be placed within an ultrasonic welding fixture 690 which is shown representatively in cross section surrounding a portion of the electrochemical battery cell 600. The ultrasonic welding fixture comprises both an ultrasonic welding horn 691 and an ultrasonic welding anvil 692. The electrochemical battery cell 600 is placed within the fixture and the ultrasonic welding horn 691 is brought into contact with the first packaging portion 640 at the locations where a weld is desired. In this methods embodiment, a weld is desired both at the anode side of the electrochemical battery cell 601 and at the cathode side of the electrochemical battery cell 602. A controlled pressure is applied by the fixture to the electrochemical battery cell bringing together the first packaging portion 640 and the second packaging portion 650. The ultrasonic horn is vibrated at a frequency appropriate for the material and the desired temperature for a predetermined amount of time that is required to weld the first and second packaging portions. The mechanical vibrations are transmitted through both packaging portions to create frictional heat. When a melting temperature is reached the thermoplastic packaging portions melts and flows and the vibration is stopped. The vibration cessation allows the melted thermoplastic of the packaging portions to begin cooling. The controlled pressure is maintained for a second predetermined time to allow the packaging portions to fuse as the melted thermoplastic cools and solidifies. Excess packaging can be trimmed at ends 693 and 694 by cutting or heat cutting the packaging portions exterior the weld. Alternatively a second controlled pressure is applied during this cooling time, and such second controlled pressure can vary and in some cases be greater than the initial controlled pressure. Once the packaging portions have solidified along its periphery thus sealing the electrochemical battery cell, the second controlled pressure is removed and the ultrasonic welding horn is retracted. By this joining process, many electrochemical battery cells can be consecutively sealed while consuming little energy. In addition, no solvents, adhesives, mechanical fasteners or other materials are required.

Figure 7:
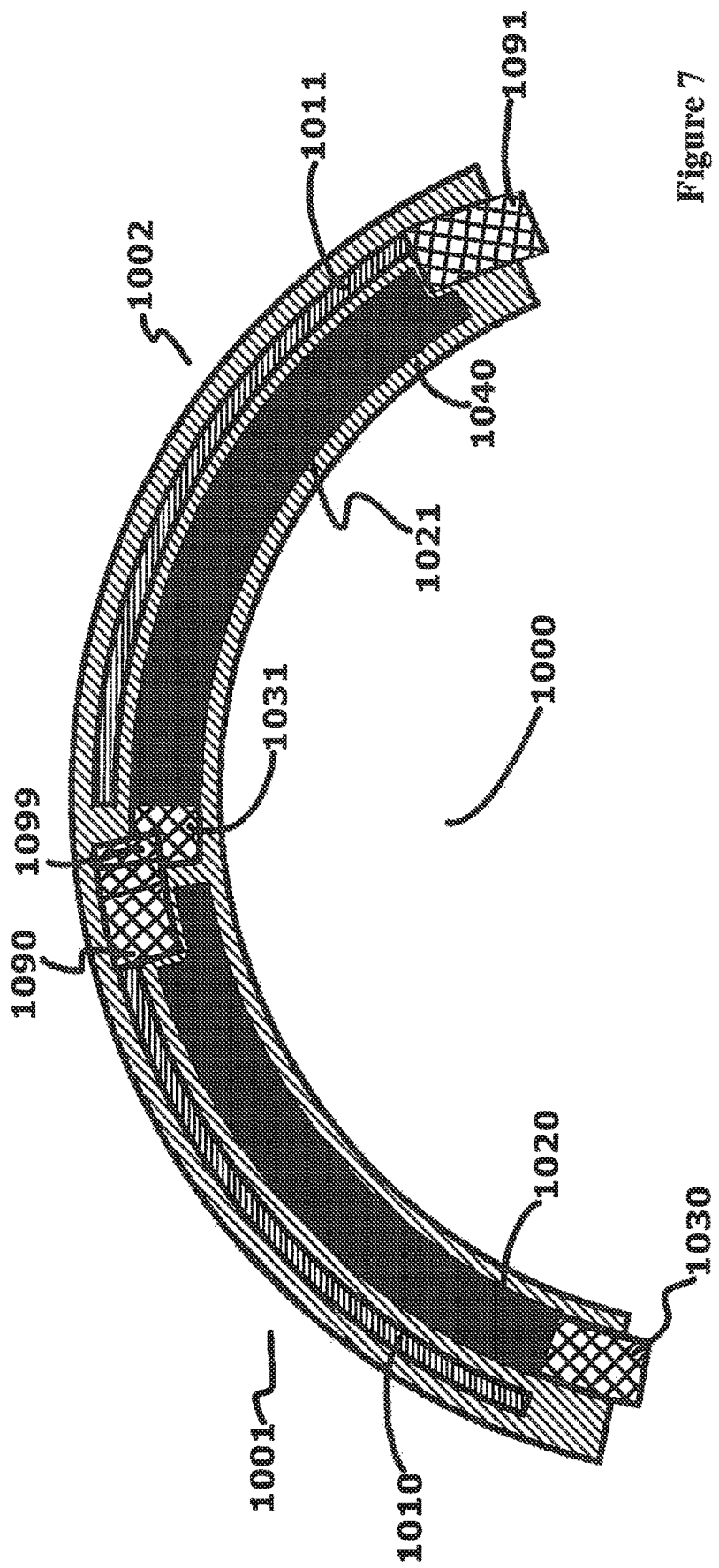
FIG. 7 is a cross sectional view of the shaped battery package illustrating two cells in series in an arcuate shape.

The present electrochemical battery cell configuration is not restricted to a linear, planar construction, and instead can be constructed in multiple shapes and sizes according to various embodiments. The components of the electrochemical battery cell as well as the packaging can be used to shape the electrochemical battery cell to its desired shape. In FIG. 7 there is shown the electrochemical battery cell 1000 in an arcuate shape. In this embodiment two electrochemical battery cells are connected in series. A first electrochemical battery cell 1001 is both electrically and mechanically connected to a second electrochemical battery cell 1002 at a connection point 1099. Both the first and second electrochemical battery cells are shown resting on a first packaging portion 1040. Although not shown, a second packaging portion is associated with the first packaging portion to form a contiguous exterior packaging exterior for the electrochemical battery cell. The first electrochemical battery cell 1001 includes an anode 1010 and a cathode 1020. The cathode is positioned in electrical communication with a first electrochemical battery cell cathode current collector 1030. The second electrochemical battery cell 1002 similarly includes an anode 1011, and a cathode 1021. The cathode 1021 is positioned adjacent and in electrical communication with a second electrochemical battery cell cathode current collector 1031. Both the anodes 1010 and 1011 possess associated anode collector tabs which are both electrically and mechanically connected to an anode end so as to conduct electrons. At connection point 1099, there is shown an electrical and mechanical connection between the first electrochemical battery cell anode collector tab 1090 and the second electrochemical battery cell cathode current collector 1031. The connection can be welded or alternatively made so that electricity can flow between both the first and second electrochemical battery cells, and so that it provides a measure of strength so that the electrochemical battery cell 1000 is fixed in the desired shape.

Each of these components in the electrochemical battery cell extend along parallel arcuate paths or vectors. For example the anode 1010 and the anode 1011 extend along an arcuate vector the length of which is approximately the length of the electrochemical battery cell 1000. The cathode 1020 and the cathode 1021 extend along a separate arcuate vector which extends in parallel to the anode vector. The electrochemical battery cell 1000 can be configured in the shown planar C-shape, or the arcuate shape can be non-planar such as frustoconical or shaped to extend about a spherical segment such as in the body of a contact lens. The shape can be maintained by the rigidity of the components or alternatively by inclusion of a structural portion which would be included within the electrochemical battery cell but not be an active component of the electrochemical reaction. For example, a die cut titanium foil can be placed within the cell interior and intermediate the first and second packaging portions. The foil structural portion would act to maintain the desired shape of the electrochemical battery cell while not significantly increasing the non-active volume of the electrochemical battery cell.

Figure 8:
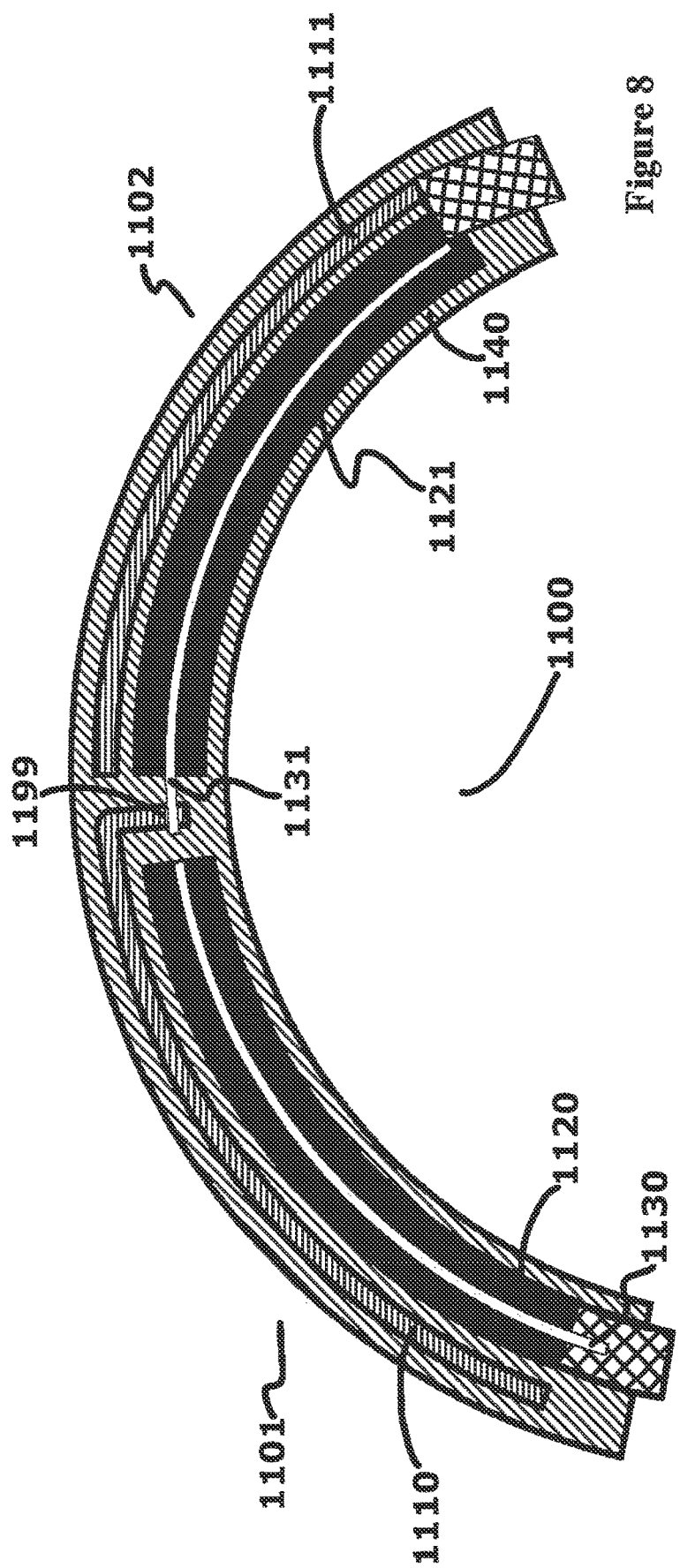
FIG. 8 is a cross sectional view of the shaped battery package showing two cells in series in an arcuate shape and highlighting how the cells are electrically connected.
Figure 9:
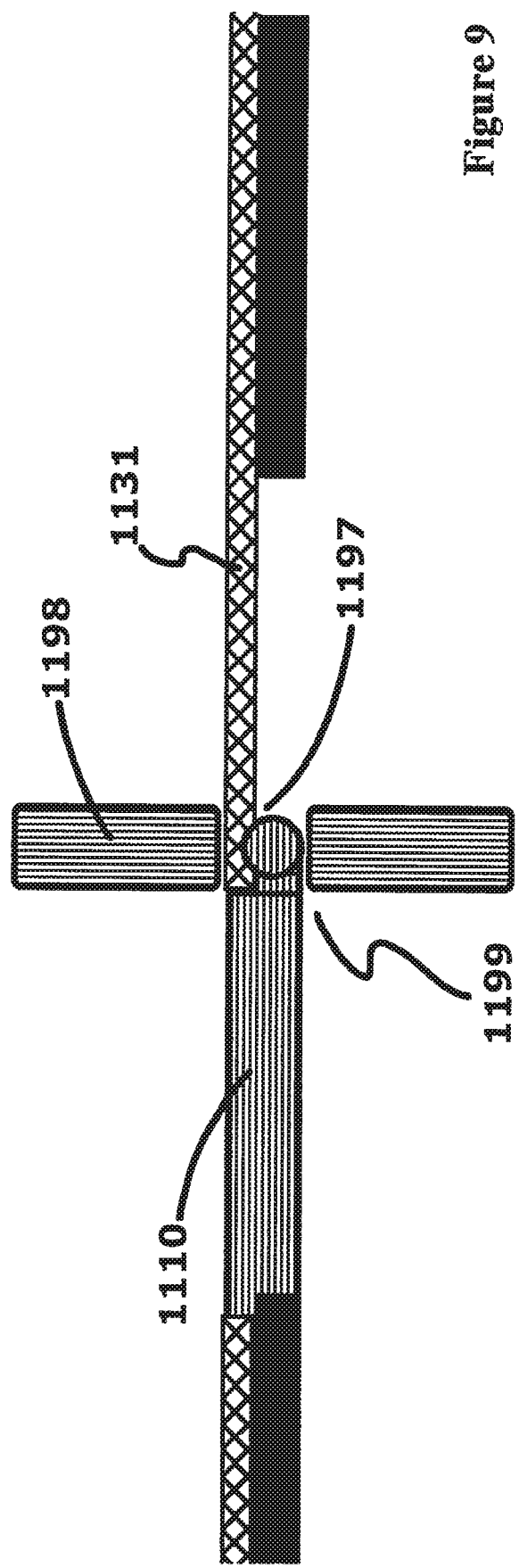
FIG. 9 is an enlarged section of the electrical connection between the two cells of the shaped battery package depicted in FIG. 8.

In FIG. 8, there is shown a top sectional view of an alternative embodiment of the electrochemical battery cell 1100. In this embodiment the electrochemical battery cell 1100 possesses a cylindrical shaped electrochemical battery cell cathode current collectors 1130 and 1131, which is shown positioned between the electrochemical battery cell cathode 1120 and 1121 and a packaging portion (not shown). Although not shown, the electrochemical battery cell cathode current collector can alternatively be disposed within or partially within the cathodes 1120 and 1121. The wire shaped cathode current collectors in combination with the wire shaped anodes provide a structural rigidity which obviates the need for any non-active structural portion. The two electrochemical battery cells 1101 and 1102 that comprise the electrochemical battery cell 1100 are electrically and mechanically connected at connection point 1199. The wire shaped first electrochemical battery cell anode 1110 and the second electrochemical battery cell cathode current collector 1131 can be joined by an ultrasonic weld as shown in FIG. 9. A compressive force holds the first electrochemical battery cell anode 1110 and the second electrochemical battery cell cathode current collector 1131 together while the ultrasonic welding fixture 1198, which is representatively shown, acts to weld the two wire shaped components to form a mechanically connected joint 1197. Alternatively the joint 1197 can be created using resistive welding of another joining technique so as to create an electrically communicating and mechanically sound joint.

Figure 10:
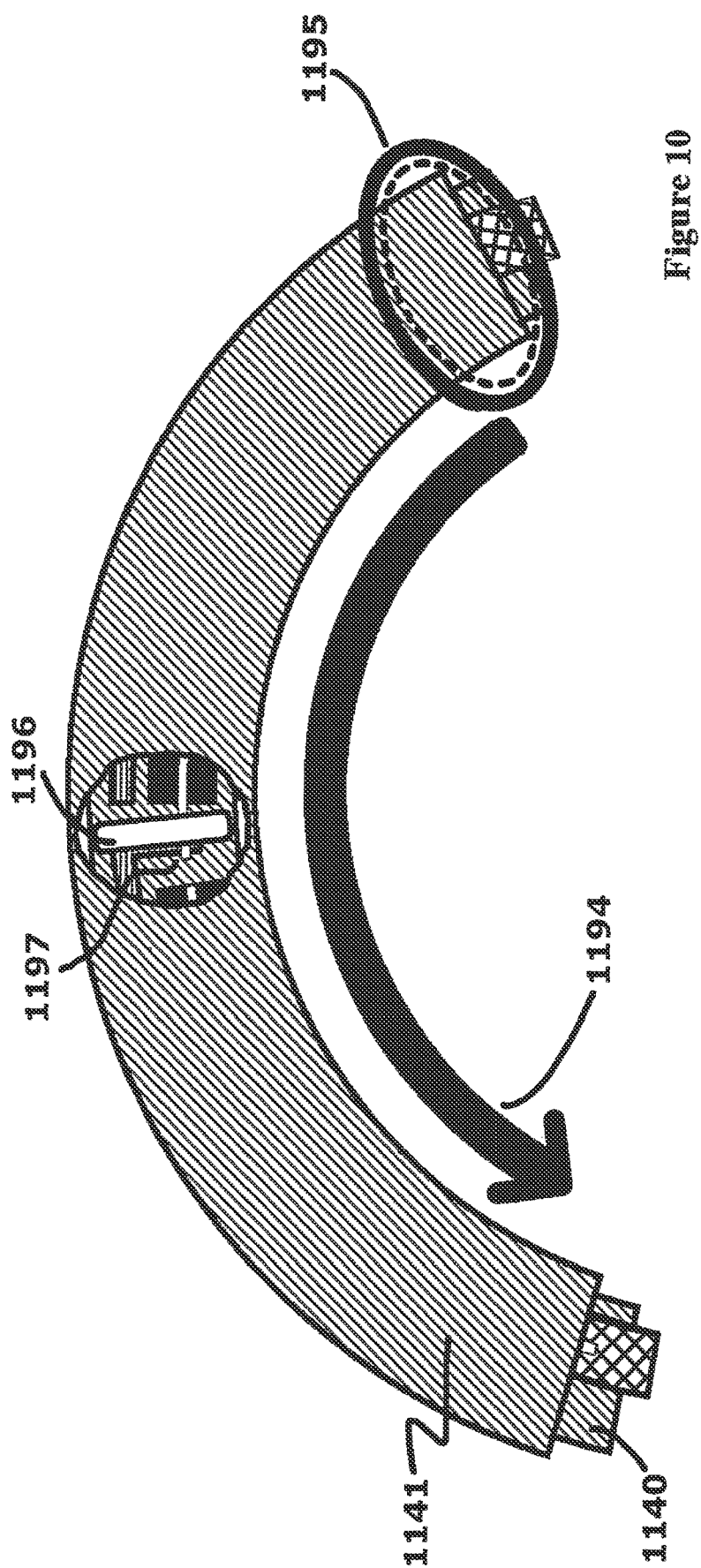
FIG. 10 is an exploded view of the electrochemical battery cell showing two cells in series in an arcuate shape, and a laser weld beam for sealing the cell packaging.

Another joining method useful to encapsulate the electrochemical battery cell is laser beam welding. In FIG. 10, the electrochemical battery cell 1100 is shown assembled with mechanically connected joint 1197 already formed and divider 1196 created to segregate the cell interior of the first and second electrochemical battery cells. A first and second packaging portion 1140 and 1141 of equal size are placed with their peripheries aligned and compressed to create a pressurized periphery along the entire periphery of the packaging portions. This can be done in a fixture which creates the pressurized periphery at the same time, or sequentially with a moving jig or fixture. While the periphery is compressed a laser weld beam can be passed along the electrochemical battery cell (in the direction shown by vector W 1194) and the compressed periphery that passes through the laser weld beam is welded by being melted and then joined during re-solidification. The laser fires many heating pulses per second forming separate overlapping spot welds that form a seam along the packaging portion periphery. So as not to cause local heating of the cell interior, battery components and electrolyte an appropriate laser wavelength is chosen. For polypropylene packaging material, 800 nm laser light is preferred.

Another embodiment of the electrochemical battery cell 1100 in FIG. 8 can be described with an alternative anode construction. In this embodiment the two electrochemical battery cells 1101 and 1102 that comprise the electrochemical battery cell 1100 are electrically and mechanically connected by sharing a common component. The anodes 1110 and 1111 each additionally comprise an anode current collector which is electrically conductive. The active anode material is then disposed onto or adjacent each anode current collector so as to be in electrical communication, while maintaining physical contact with the anode current collector. The use of such an anode current collector enables it to also be used as a cathode collector in an adjacently connected cell. For example, the electrochemical battery cell anode current collector (not shown) of the first electrochemical battery cell 1101 can extend into the second electrochemical battery cell and be used as the cathode current collector 1131 of the second electrochemical battery cell. By use of this common cell component, the first electrochemical battery cell 1101 and the second electrochemical battery cell 1102 are electrically and mechanically connected without the need for any weld or joint.

EXAMPLES

The compositions and processes described here, and ways to make and use them are illustrated in the following examples.

Example 1

Substrate Preparation

Figure 11A:
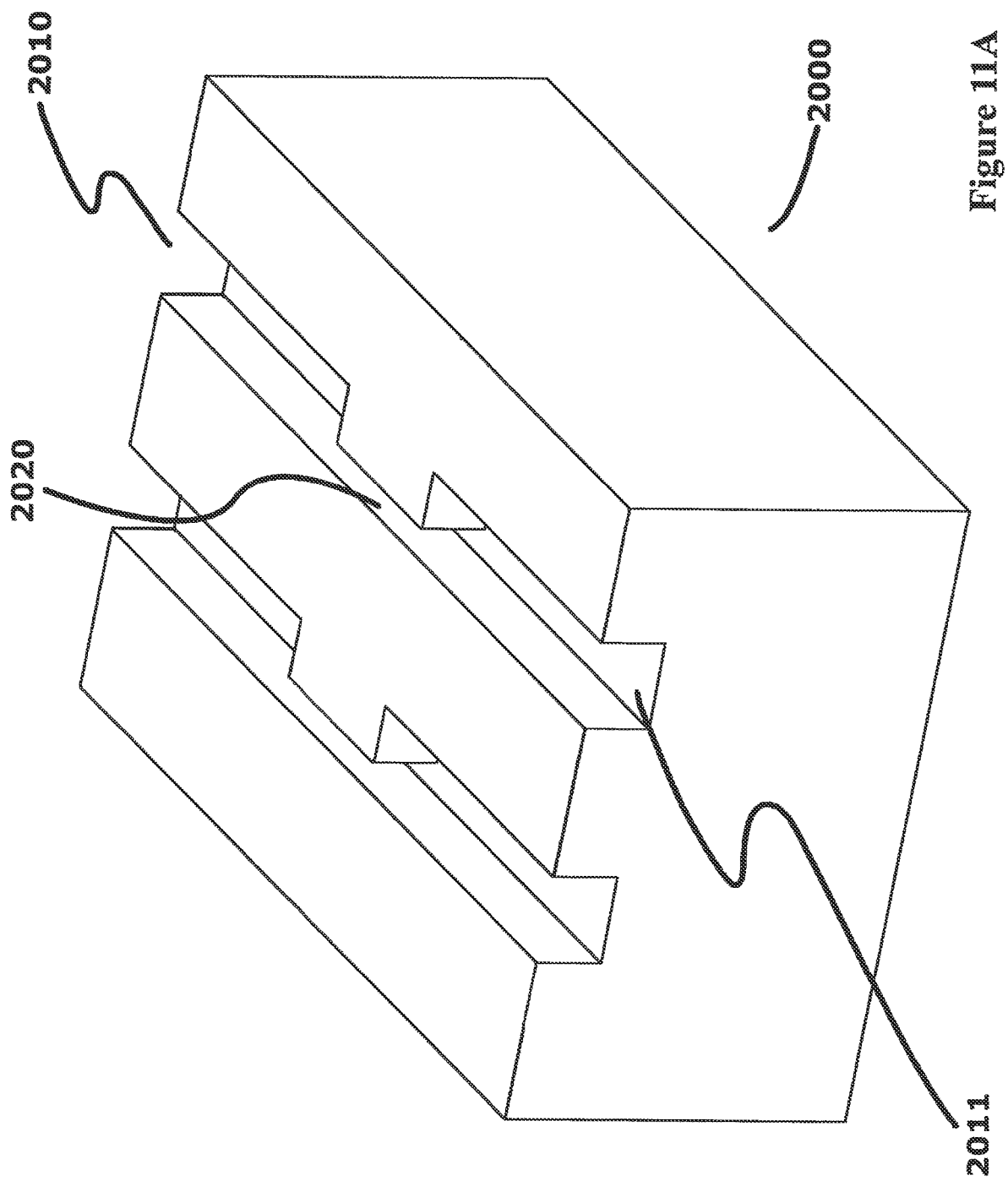
FIG. 11A is a perspective view of substrate used to prepare the present invention in the illustrative example.

A polycarbonate block was cut into sections. First and second slots 2010, 2011 (each approximately 0.325 inch long×0.008 inch deep×0.0393 inch wide) were milled from the surface of the block 2000 as shown in FIG. 11A. A channel 2020 (between 0.007" wide and 0.01" wide) was then cut intermediate the first and second slots 2010 and 2011, connecting the two larger slots in line. Each finished slot is used to hold a cell.

Cathode Preparation

A cathode sheet was prepared with a composition of 10% by weight of carbon black (e.g. ACE Black from Soltex, Houston, Tex., or Acetylene Black Grade 100%), 83-85% by weight of fine electrolytic manganese dioxide (e.g. Tronox of Stamford, Conn.). and the balance (5-7%) by weight PTFE (e.g. 60 wt % dispersion of PTFE in water, available as TE3859 from Dupont Polymers (Wilmington, Del.)—has 60.6% solids in batch, 5.7% wetting agent) The sheet was prepared by combining the carbon black and manganese dioxide in a mixing container, and mixing at 1,000 RPM for 3 minutes in a Thinky mixer Model Number ARM-310 from Thinky of Laguna Hills, Calif. Then, roughly 1.05 grams of de-ionized water per gram of manganese dioxide was added to the mixing container, which was again mixed at 1,000 RPM for 3 minutes. Then, the PTFE was added, and mixed at 200 RPM in the mixer to disperse the PTFE, and then at 1,500 RPM to fibrillate the PTFE, forming a coherent mass.

The resulting coherent mass was then kneaded until the viscosity increases to the point where the material stiffness is increased and the material is formable. Pieces of battery packaging laminate consisting of a heat-resistant polymer outer layer, inner aluminum foil core, and heat-sealable polymer inner layer (e.g. packaging from Ultra Flex Corporation, Brooklyn, N.Y. The packaging consists of a 0.001" polyethylene heat-sealable layer on one side, a 48 gauge (0.0005") PET film on the other, and a 0.000316" aluminum foil layer in between the two) were cut, and folded lengthwise in half with the heat-resistant layer on the outside. Pieces of the coherent mass were broken off, and placed on the inside of the packaging folded lengthwise. The coherent mass was rolled down using a jeweler's mill; the material was periodically folded back on itself to enhance the fibrillation and bonding, and at times the material was rotated 90 degrees in position against the packaging to avoid its spilling out over the edge. Sheets of roughly 150 micron thickness were prepared in this manner from the cathode mix. This sheet was removed from the packaging material, placed on a weigh boat, and air-dried at room temperature for a few hours. Finally, the sheet was dried at 60° C. between a few hours and overnight.

Electrolyte Formulation

The electrolyte was first prepared using a mixture of 1.9 M $NH_4Cl$ and 0.63 M $CaCl_2$ In deionized water.

A gelled electrolyte was then prepared, as follows: An amount of electrolyte was added to a beaker containing a stir bar. This beaker was covered to prevent evaporation, and heated and stirred on a stirring hot-plate until boiling. De-ionized water was then added to replace the water which had evaporated as determined by weighing. Sufficient agar was added to the beaker to produce a mixture containing 97% by weight of the electrolyte, and 3% by weight of agar. The electrolyte with agar was stirred on the hot-plate until the agar dissolved, then de-ionized water was added to replace the water which had evaporated. The mixture was then stirred and allowed to cool to room temperature, forming a soft, cloudy gel.

Anode

Commercial pure zinc wire (e.g. (0.006" pure zinc 99.95% wire from California Fine Wire of Grover Beach, Calif.) was obtained.

Cathode-Current Collector Assembly Procedure

Figure 11C:
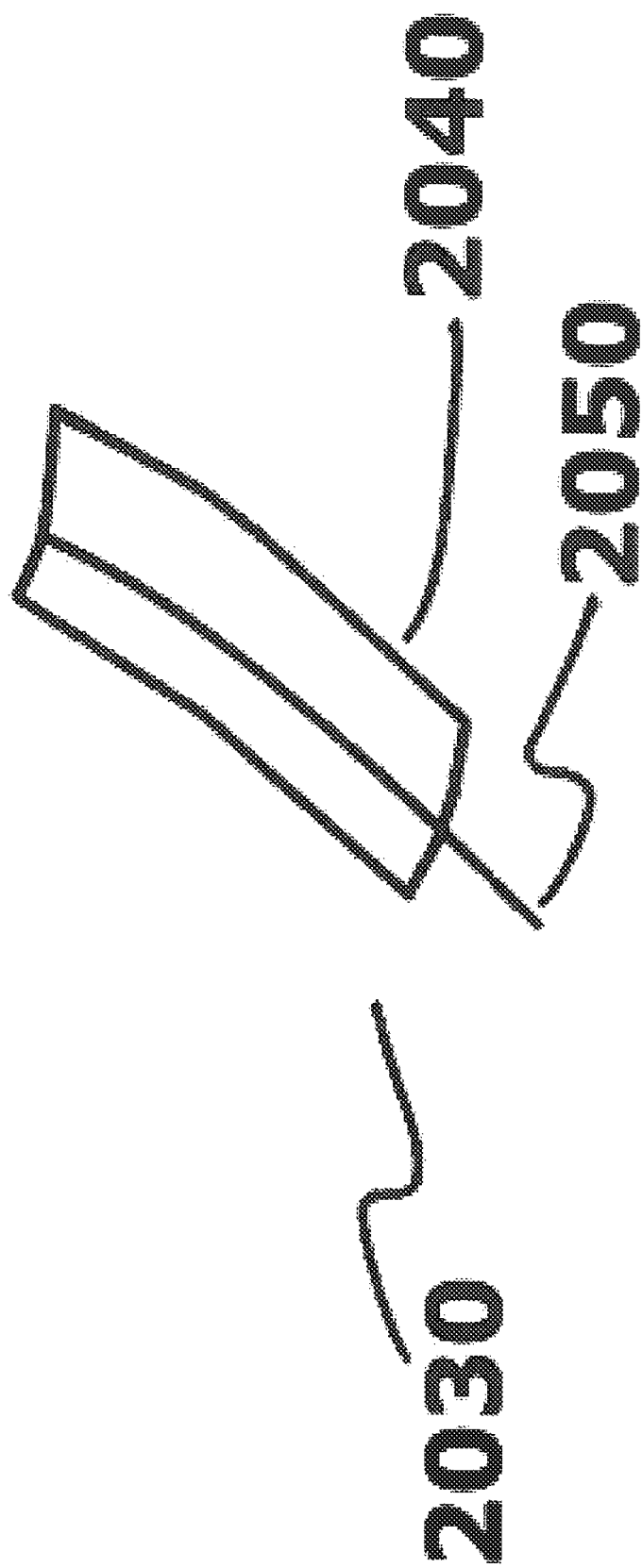
FIG. 11C is a perspective view of the cathode and cathode collector assembly of the present invention as described in the illustrative example.

Strips of cathode material roughly 7 mm long were cut from a roughly 150 µm thick piece of cathode material using a blade. Then, thinner strips up to 3 mm or so wide (but at least 600 µm wide) were cut from these strips. Short lengths (roughly 2 cm to 10 cm) of 0.002 inch diameter titanium wire (e.g. 0.050 mm 99.8% pure, hard temper Titanium wire from Goodfellow of Coraopolis, Pa.) were cut from a roll, and their ends were attached to a plastic weigh boat with a small dot of epoxy, which was allowed to cure. The assembly of the cathode is illustrated in FIG. 11B. The cathode strips 2040 were placed beneath the wire 2050 glued at one end 2051, and the wire was held taut over the strip. With the wire held taut, a conductive glue coating (e.g. prepared containing a polymeric binder and graphite flakes e.g. TIMCAL E-LB 1020, from Timcal of Westlake, Ohio). After the conductive coating was dried enough to hold the wire 2050 to the surface of the cathode sheet 2040, the end of the wire held taut was released. After the coating was dried in air for a few hours, the wire was cut away from one end 2051 of the assembly using a blade, the other end of the wire was trimmed to a shorter length, and the cathode strip 2040 was cut to a width of between 400 and 800 µm—see FIG. 11C.

Cell Assembly Procedure

The cathode-current collector assembly was glued into the plastic substrate 2000 as shown in FIG. 11D using the conductive coating/glue. The cathode-current collector assembly 2030 was set in place with the wire facing down, to enable wetting the cathode strip 2040 later. The cathode-current collector assembly 2030 was first attached at the end 2012 of the slot 2010; the cathode-current collector assembly 2030 was then flexed away from the wall of the slot, additional conductive glue applied along the wall, and the cathode-current collector assembly 2030 pressed against the wall of the slot. If excess cathode material was present which would prevent clearance between the zinc wire 2060 inserted later and the cathode, the excess material was removed Lengths of the zinc wire approximately 1.5 centimeters were cut and straightened. They were placed in the slot 2010 and extended out the open end of the cell; a small amount of epoxy was applied to hold the wire in place. Then, epoxy was applied across the channel opening of the slot, and polyimide tape (e.g. Kapton Brand) was placed over the opening of the slot until the epoxy had cured. At that point, the polyimide tape was removed. Then, electrolyte was applied to cover the slot, and allowed to soak into the cathode. An absorbent paper wipe was then used to remove all of the electrolyte from the slot and the area of the substrate surrounding the slot, except for that absorbed within the cathode. Gelled electrolyte was then added to fill the slot. A piece of polyimide adhesive tape (e.g. Kapton Brand) was placed over the top of the slot including the end; this tape would normally extend end-to-end with two cells vertically in place.

Then, two-part epoxy was used to cover over top of the polyimide tape, and also to cover the ends of the block where the wires exit the slot. Once the epoxy was cured, the polycarbonate substrate was secured. Then, smooth-jawed alligator clips were used to clip onto the wires (titanium and zinc) coming out of the cells, taking care not to short the cells. Insulator was placed between the clips to prevent them from touching. The insulators were removed after the epoxy had gelled, but before it was fully hardened. The cells were tested using ordinary battery test equipment.

Table 1 is the performance and general description of the electrochemical battery cell which was prepared as described in Example 1.

TABLE 1

| | |
|---|---|
| Capacity | 140 µA-h at 10 µA |
| Resistance | ~800-1500 Ω (typical) at 100 µA |
| Cell dimensions (slot in substrate) | 0.325 inch long × 0.008 inch deep × 0.0393 inch wide (~0.03 inch wide)-roughly 8.3 mm × 200 µm × 1 mm (~1.7 µL) |
| Open Circuit Voltage | 1.5 V (nominal) |

Example 2

Zinc Powder Anode

An anode using zinc as a bound powder was prepared. Zinc powder (e.g. EEF grade from Umicore, Belgium) was prepared using PTFE (from TE3859 dispersion) as a binder, and using Acetylene Black (AB100%) as a conductive filler, with a composition of 5% acetylene black, 5% PTFE, and 90% zinc by weight. 20 grams of zinc were mixed by hand with 1.11 grams of acetylene black using a plastic spatula to form a visually homogeneous mixture. This mixture was then mixed using a Thinky ARM-310 mixer for three minutes at 1000 RPM with 9 grams of de-ionized water. Then, 1.85 grams of 60% PTFE (TE3859) dispersion were added to the mixture, which was mixed for three minutes at 200 RPM to disperse, then three minutes at 1000 RPM to fibrillate to form a coherent mass. This coherent mass was then kneaded and rolled between pieces of battery packaging (from Ultra Flex Corporation, Brooklyn, N.Y. The packaging consists of a 0.001" polyethylene heat-sealable layer on one side, a 48 gauge (0.0005") PET film on the other, and a 0.000316" aluminum foil layer in between the two). As with the cathode sheet preparation, pieces of this laminate were cut, and folded lengthwise in half with the heat-resistant layer on the outside. Pieces of the coherent mass were broken off and placed on the inside of the packaging folded lengthwise. The coherent mass was rolled down using a jeweler's mill; the material was periodically folded back on itself to enhance the fibrillation and bonding, and at times the material was rotated 90 degrees in position against the packaging to avoid its spilling out over the edge. Sheets of roughly 150 micron thickness were prepared in this manner from the cathode mix. This sheet was removed from the packaging material, placed on a weigh boat, and air-dried at room temperature for a few hours. Finally, the sheet was dried at 60° C. between a few hours and overnight.

Strips of the anode material approximately 300 microns wide×150 microns thick×7-8 mm long were cut out, and then attached using the conductive glue (Timcal E-LB 1020) to 50 micron titanium wire current collectors (e.g. from Goodfellow, Coraopolis Pa.), as was done using for the cathode.

A cathode sheet consisting of 10 weight % acetylene black (AB100), 5 weight % PTFE (from TE3859 dispersion), and 85% fine $MnO_2$ (Tronox) was prepared as described in Example 1. Strips of material roughly 10 mm wide×150 μm thick were cut from this sheet. Pieces of titanium foil were cut, and transparent tape was applied to leave an approximately 7 mm wide strip of bare foil. This foil was then painted over with conductive glue, and a strip of the cathode sheet was pressed in while the glue was still wet. After drying for roughly two hours to overnight at 60°, the foil was removed from the oven, and cut into strips inserted into an experimental holder; these strips acted as the counter-electrode. The experimental sample holder had a piece of zinc foil used as a quasi-reference electrode, the bound zinc sheet attached to the 50μ titanium wire acting as the working electrode, and the titanium foil with cathode sheet attached was the counter electrode. All three electrodes were together in a glass vial containing 1.9 M $NH_4Cl_2$ and 0.63M $CaCl_2$ in de-ionized water electrolyte. A test was performed on three samples, consisting of alternating open-circuit periods of 30 seconds with pulses of 5, 10, and 100 μA applied to the working electrode, followed by an open-circuit period of 30 seconds. The internal resistance of each electrode was taken as the average of the resistance determined from the voltage drop at the beginning and end of the 100 μA pulse. The three samples had resistances of 101, 183, and 145Ω.

Exemplary Component Compositions

A wide variety of compositions can be used in the electrochemical battery cell. Any combination of components would be selected for electrochemical compatibility, and for the ultimate use of the electrochemical cell. For example if biocompatibility is required, components would be thus selected.

Approval of medical devices by regulatory agencies require that a biocompatibility assessment be conducted to assure safety of the device or material. Biocompatibility classification is thus obtained by testing according to certain guidelines, including ISO 10993, "Biological Evaluation of Medical Devices," and the Japan Ministry of Health, Labour and Welfare (MHLW) "Testing Methods to Evaluate Biological Safety of Medical Devices," Notice from the Office Medical Devices. The testing of the biocompatibility of a device is intended to demonstrate that the device should not, either directly or through the release of its material constituents: (i) produce adverse local or systemic effects; (ii) be carcinogenic; or (iii) produce adverse reproductive and developmental effects. Some materials have been well characterized chemically and physically in the published literature and in the marketplace and have a long history of safe use. Such materials can be considered biocompatible and are thus preferred. Materials that are used in medical device batteries can affect a human eye by touch, leak from the battery due to, for example, an accident or an improper sealing of the battery. Use of biocompatible materials minimizes any risk of such complications occurring if the leaking or leached materials make contact with the eye or other human tissues.

The anode is the electrode component which is oxidized in the electrochemical battery reaction. In one embodiment, the anode comprises zinc as the active component in the form of a contiguous wire or thin cylinder. The zinc is preferably battery grade in that it is free from impurities generally understood by those skilled in the art to promote corrosion and other undesirable side reactions in the battery. The zinc is also preferably alloyed with alloys such as bismuth, indium, calcium, or aluminum so as to increase shelf life. Lead in small amounts has also been shown to be an effective zinc alloy material. Although thought of as non-biocompatible, the lead stays within the zinc grain boundaries and is not dissolved in the electrolyte. Thus, such added lead may not create a biocompatibility issue. The anode wire also acts to collect the electrons flowing from the anode and transport them out of the electrochemical battery cell. To accomplish this dual role excess anode is preferably added to the battery to ensure the anode remains contiguous. Zinc powder can be used as an alternative anode material as is shown in Example 2.

The cathode is the electrode component which is reduced in the electrochemical battery reaction, and when the electrochemical battery cell is placed in a circuit with a load, the cathode attracts electrons from the circuit. The preferred cathode material may be manganese dioxide which is mixed with a conductor additive and binder to form a cathode mix. It may be preferable to include as much manganese dioxide in the cathode mix to maximize the capacity of the electrochemical battery cell and to reduce the necessary size of the cathode. The amount of cathode in the electrochemical battery cell is determined relative the anode and its active amount. The molar amounts of each the anode and cathode are determined so that the cell reaction can be accomplished for the desired duration. The form of the cathode is planar in one embodiment, but can be cylindrical in an alternative embodiment. The cylindrical cathode can be extruded or otherwise shaped while being formed.

The conductor is used to enable electron flow between cathode particles and from and to the cathode current collector. The amount of conductor is preferably minimized so as to accomplish this task as there is little benefit to adding excess conductor. Conductors appropriate are graphite, expanded graphite, acetylene black, carbon black, and other conductors known by those skilled in the art. Preferably acetylene black is used in the present invention as it provides the cathode mix a desired level of electrolyte absorptivity.

Binder is used in the cathode mix to provide structure to the cathode throughout the electrochemical battery cell life. The binders ability to provide this structure should not be altered by the electrolyte or by the expansion of the manganese dioxide. Preferred binders include particulate Teflon® (PTFE) emulsion which can be fibrillated during mixing of the cathode mix.

The cathode mix electrically communicates with the cathode collector, and the purpose of the cathode collector is to both electrically communicate electrons to and from the cathode but to also provide structure to the electrochemical battery cell. A titanium wire is the preferred structure for the cathode collector as it adequately conducts and has the required rigidity in small diameters. Titanium mesh, titanium ribbon, expanded mesh, braided wire all are alternative cathode collector materials.

Electrolyte is selected for compatibility with the reactive electrode materials. For the zinc anode and a manganese dioxide cathode, a LeClanche electrolyte, or ammonium chloride $NH_4Cl$ solution, Zinc Chloride ZnCl, Zinc acetate and mixture thereof, are preferred. Salines, such as sodium chloride NaCl, magnesium chloride $MgCl_2$ and potassium chloride KCl solutions can alternatively be used, although capacity of the battery would be negatively affected. For the gelled electrolyte, agar or an alternative gelling agent can be used. The gelling agent is to increase the viscosity of the electrolyte so that it remains within the cell at a location where it is useful, namely between the anode and cathode.

The gelled electrolyte can be located throughout the cell interior of the electrochemical battery cell, and is most preferably located between the anode and cathode which are disposed relative each other by a predetermined distance. This predetermined distance can be calculated by those skilled in the art, but the distance should allow for tolerances necessary to prevent short circuits caused by the anode and cathode coming in contact with each other. As there is no separator or other physical barrier between the electrodes, a practical distance is necessary in this embodiment. The gelled electrolyte viscosity does act to hinder movement of the electrodes and its placement between the electrodes both acts to enable ionic communication and to prevent movement of the electrodes towards each other. The gelled electrolyte can also enhance biocompatibility, by providing a physical barrier around the electrodes. Particles moving from the electrodes are caught in the gelled electrolyte and prevented from moving away from the electrochemical battery cell or towards the other electrode. In another embodiment a thin barrier may be placed between the anode and cathode to prevent relative contact. The thin barrier may be made of a separator material or an ionically conductive and electronically insulating material.

An anode tab can be mechanically connected to the anode so that it can electrically transport created electrons from the anode to the negative terminal of the electrochemical battery cell. Using an extension of zinc wire for this purpose may corrode or otherwise affect biocompatibility. Therefore titanium or other corrosive resistive conductive materials are appropriate to extend the anode through any packaging material to provide the required external electron conduit.

The electrochemical battery cell may be enclosed in a packaging material to enclose the cell components so as to enhance shelf life, restrict ionic, oxygen, and water migration into and out of the cell, and to ensure biocompatibility. As the packaging material is inert and plays no role in the performance of the battery, minimizing the thickness and amount of the material is preferred. A material that is inert and does not interfere with the cell reactions is also preferred as is a material that is easily formed into a contiguous exterior around the entire electrochemical battery cell while enabling sealing of the terminal electrodes which necessarily penetrate the packaging and protrude from the packaging. The packaging material is also preferably easily formed and sealed by high speed manufacturing processes. Pigmentation of the packaging material may also be desired and this requirement may inform the packing material selection. Polypropylene is preferred as a packaging material in that it is easily weldable via a variety of processes including heat, ultrasonic and laser welding. In addition, polypropylene is adhesive-bondable and available in a variety of thicknesses and densities. In addition, polypropylene is impervious to the preferred electrolyte compositions and will contribute to biocompatibility. Alternative biocompatible polymers such as polyurethane, polyvinylpyrrolidone, silicone elastomers, polyethylene, polytetrafluoroethylene, poly-(p-phenylene-terephthalamide), polyvinyl chloride, polypropylene, polyolefins, polyesters, polyacrylates (including polymethacrylates).

The battery exterior or the exterior surface of the packaging material can also be coated to further render it biocompatible. Appropriate biocompatible coatings include phosphorylcholine and poly-para-xylylenes, such as paralene C.

Sealing methods for the packaging material include the described ultrasonic and laser beam welding. Alternative sealing methods include heat welding and the use of biocompatible adhesives.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

What is claimed is:

1. An electrochemical micro-battery comprising biocompatible cell components including: a cylindrical anode extending along a first vector;
    a generally planar cathode extending along a second vector, wherein said second vector is generally parallel to said first vector, said cathode being disposed from said anode by a predetermined space;
    a cathode collector in electrical contact with said cathode and extending along said second vector;
    an electrolyte positioned generally surrounding said anode and said cathode and within said predetermined space to provide ionic conductivity between said anode and said cathode; and
    flexible packaging generally surrounding said anode, said cathode, said cathode collector and said electrolyte, wherein said anode extends through said packaging along said first vector, and said cathode collector extends through said packaging along said second vector.

2. The electrochemical micro-battery according to claim 1, wherein both said first vector and said second vector are arcuate, and wherein said first vector and second vector are concentric to each other.

3. The electrochemical micro-battery according to claim 1, wherein said anode is a zinc wire.

4. The electrochemical micro-battery according to claim 1, wherein said cathode comprises manganese dioxide, a conductive material, and a binder.

5. The electrochemical micro-battery according to claim 1, wherein the cathode collector is positioned within the cathode.

6. The electrochemical micro-battery according to claim 1, wherein the diameter of the anode equals the thickness of the cathode, so that the thickness of said electrochemical cell equals the anode diameter in addition to said packaging thickness.

7. The electrochemical micro-battery according to claim 1, further comprising a second electrochemical cell connected in series to said electrochemical cell, wherein said anode of the electrochemical cell is electrically connected to the cathode collector of said second electrochemical cell, and wherein said packaging of said electrochemical cell and said packaging of said second electrochemical cell are joined as to form a contiguous package.

8. The electrochemical micro-battery according to claim 7, wherein said anode of the electrochemical cell is welded to said cathode collector of said second electrochemical cell.

9. The electrochemical micro-battery according to claim 1, wherein said packaging is vacuum formed.

10. The electrochemical micro-battery according to claim 1, wherein said packaging prevents water and oxygen migration through said packaging.

11. The electrochemical micro-battery according to claim 1, further comprising a second electrochemical cell connected in series to said electrochemical cell, wherein said anode of the electrochemical cell further includes an anode collector in electrical communication with said anode of the electrochemical cell, wherein said anode collector extends out of said electrochemical cell and extends into said second electrochemical cell, and wherein said anode collector is electrically connected to the cathode of said second electrochemical cell, and wherein said packaging of said electrochemical cell and said packaging of said second electrochemical cell are joined as to form a contiguous package.

* * * * *